United States Patent [19]

Pettingell

[11] Patent Number: 5,942,018
[45] Date of Patent: Aug. 24, 1999

[54] GLASS ARTICLE FORMING MACHINE

[75] Inventor: James R. Pettingell, Glastonbury, Conn.

[73] Assignee: Emhart Glass S.A., Cham, Switzerland

[21] Appl. No.: 08/074,303

[22] Filed: Jun. 9, 1993

[51] Int. Cl.[6] ...................................................... C03B 7/00
[52] U.S. Cl. ........................... 65/159; 65/164; 65/DIG. 3; 364/473; 364/476
[58] Field of Search ................................. 65/164, DIG. 3, 65/159; 364/473, 476

[56] References Cited

U.S. PATENT DOCUMENTS

| | | | |
|---|---|---|---|
| 3,762,907 | 10/1973 | Quinn | 65/164 |
| 3,905,793 | 9/1975 | Croughwell | 65/163 |
| 4,104,046 | 8/1978 | McCreery | 65/DIG. 13 |
| 4,338,115 | 7/1982 | Farkas | 65/DIG. 13 |
| 4,364,764 | 12/1982 | Farkas | 65/164 |
| 4,459,146 | 7/1984 | Farkas | 65/DIG. 13 |
| 4,469,501 | 9/1984 | Kingsbury | 65/164 |
| 5,247,450 | 9/1993 | Clark | 364/473 |

*Primary Examiner*—John Hoffmann
*Attorney, Agent, or Firm*—Spencer T. Smith

[57] ABSTRACT

A machine for making glass containers having a number of displaceable mechanisms comprising a plurality of selectively operable regulators for controlling the operation of the displaceable mechanisms, a control panel including a corresponding plurality of toggle switches switchable between select and deselect positions, each toggle switch being associated with one of the regulators. The control panel is enabled when all of the toggle switches are in the down position and start motion buttons pushed simultaneously will implement the machine state defined by the operator by locating specific toggle switches in the select position.

6 Claims, 4 Drawing Sheets

GLASS ARTICLE FORMING MACHINE

The present invention relates to machines which form glass articles like containers or tableware from gobs of molten glass. One such machine is an Individual Section (I.S.) machine which has a number of identical sections, each of which can be viewed as a discrete machine since each receives gobs of molten glass and forms them into containers.

Each section or machine has a number of mechanisms which are displaced by non profiled motion actuators such as pneumatic cylinders. Process air like settle air or cooling air may also be required. In state of the art machines these mechanisms, etc. are controlled by regulators such as solenoid operated valves (single acting, spring return or double acting).

The machine is intended to operate under automatic control but during set-up and repair, the operator must be able to operate the machine under manual control.

It is accordingly an object of the present invention to provide a manually controlled system for operating the I.S. machine that minimizes these risks.

Other objects and advantages of the present invention will become apparent from the following portion of this specification and from the accompanying drawings which illustrate in accordance with the mandate of the patent statutes a presently preferred embodiment incorporating the principles of the invention.

REFERRING TO THE DRAWINGS

Figures 1, 2:
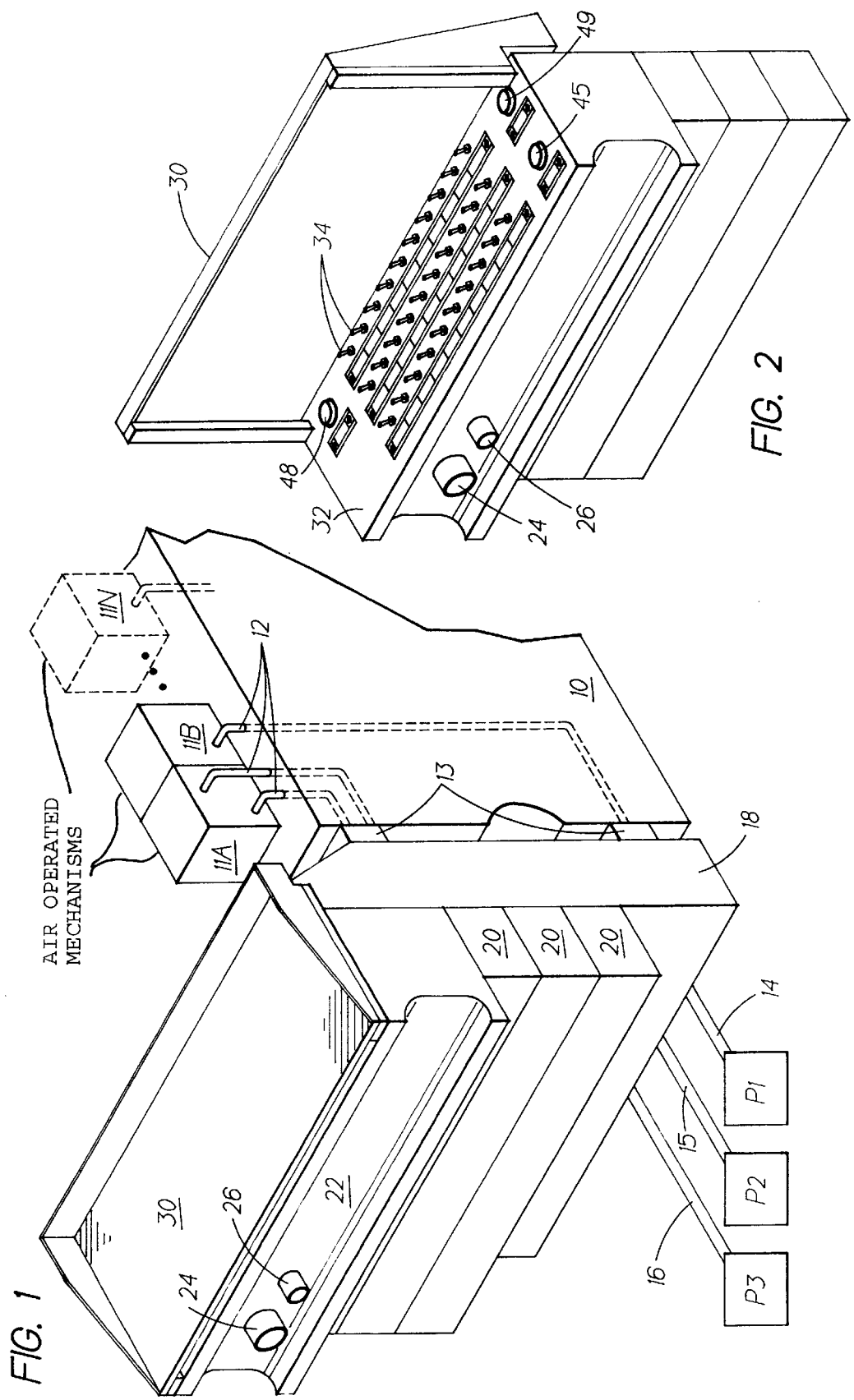
FIG. 1 is a schematic illustration of the valve block assembly made in accordance with the teachings of the present invention connected to an individual section of an I.S. machine.
FIG. 2 is a view of a portion of the valve block assembly shown in FIG. 1 with the cover displaced to its vertical position exposing the manually operated control panel.

FIG. 1 is a schematic showing of a portion of one of the plurality (6, 8, 10, 12, for example) of sections of an I.S. machine. The section frame 10 supports a number of air operated mechanisms 11A, 11B . . . 11N such as an invert, takeout, mold opening and closing mechanism, etc. which have to be repeatedly displaced. U.S. Pat. No. 4,362,544 describes in detail these mechanisms. The air lines 12 for these mechanisms are connected to one or more "KISS" plates 13. High pressure P1, low pressure P2 and pilot air P3 are supplied through pipes 14, 15, 16 to a manifold 18 and from the manifold to the valve blocks 20. This high and low pressure air is selectively redirected back to the manifold where it is directed through passages in the manifold to associated passages in the kiss plates and into the frame conduits 12. As shown, one mechanism 11A has two air lines and could, for example, include a three way, double acting valve, whereas mechanism 11B has only one air line and could, for example, include a pilot operated single acting, spring return valve with either low pressure or high pressure air serving as this pilot air. Other air lines (not shown) deliver process air as required. A console 22 is located above the valve blocks and houses the electronics for controlling the solenoid valves. A machine stop button 24 and associated machine stop light 26 may be located on the front of the console. The machine stop button, when operated, removes power from all contacts in the automatic control. Further details of the manifold and valve blocks are disclosed in U.S. patent application Ser. No. 08/047,680, filed on Apr. 15, 1993.

Figure 3:
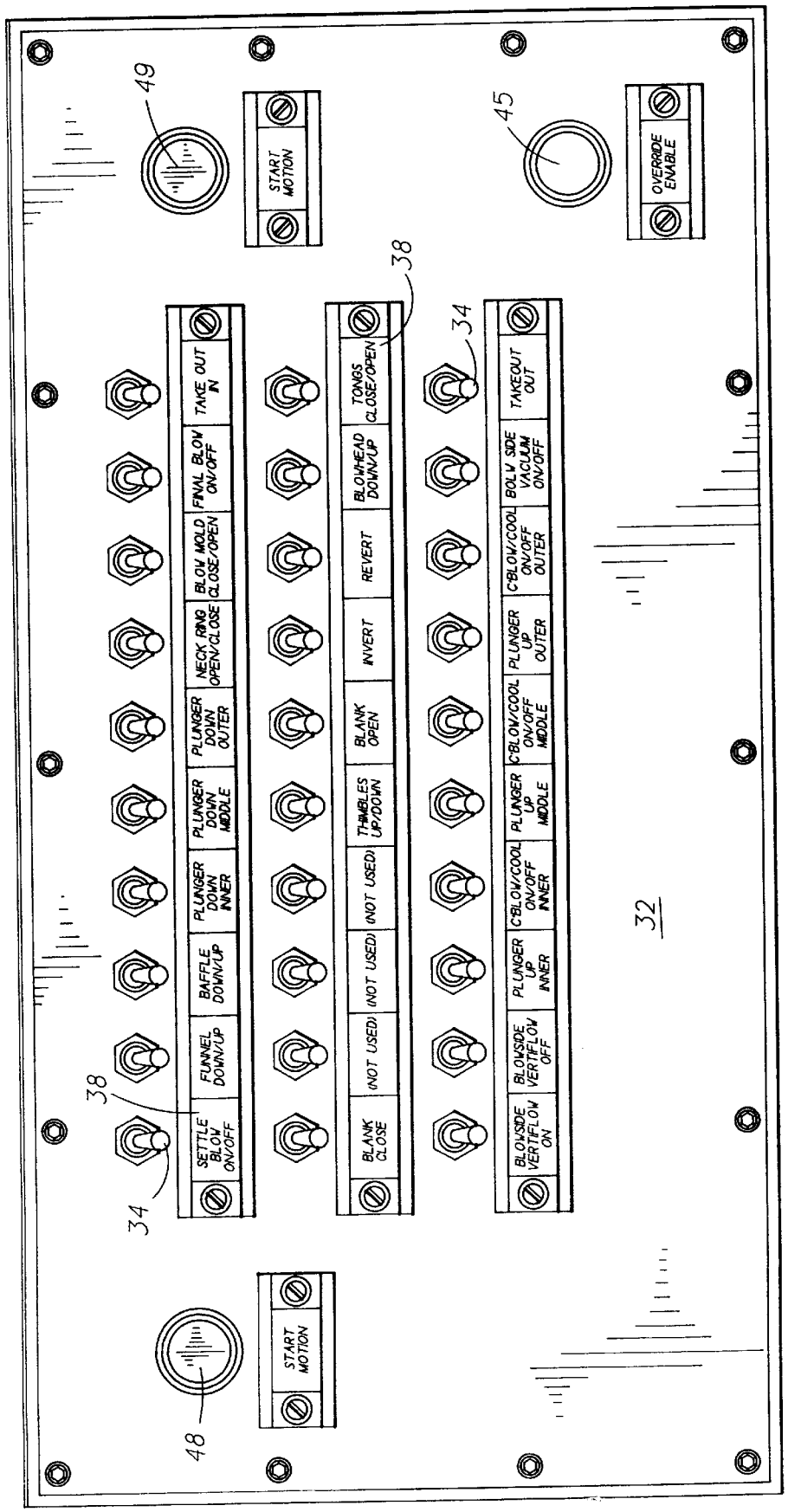
FIG. 3 is a top view of the control panel.
Figure 4:
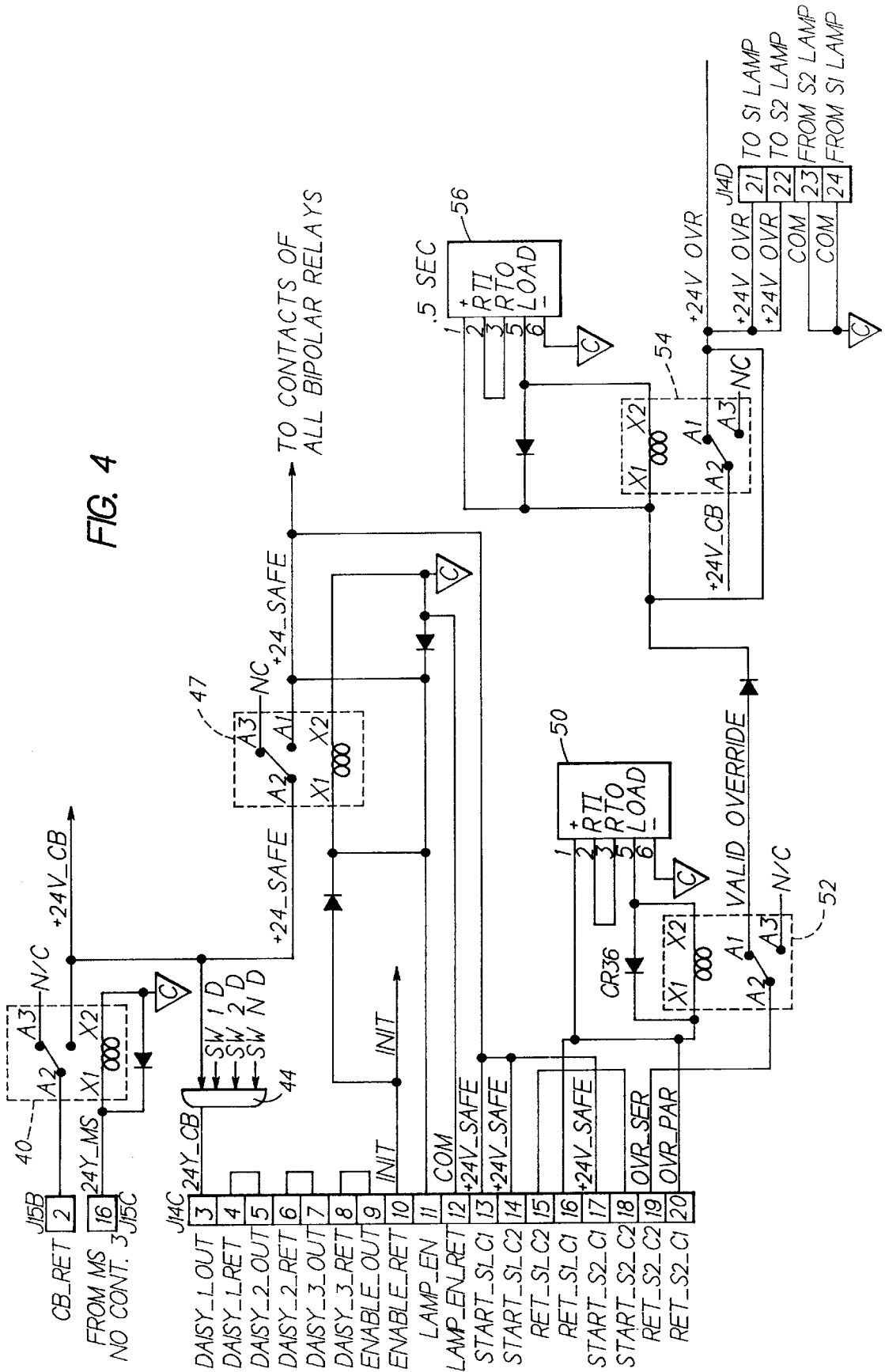
FIG. 4 is an electronic schematic for the control panel.
Figure 5:
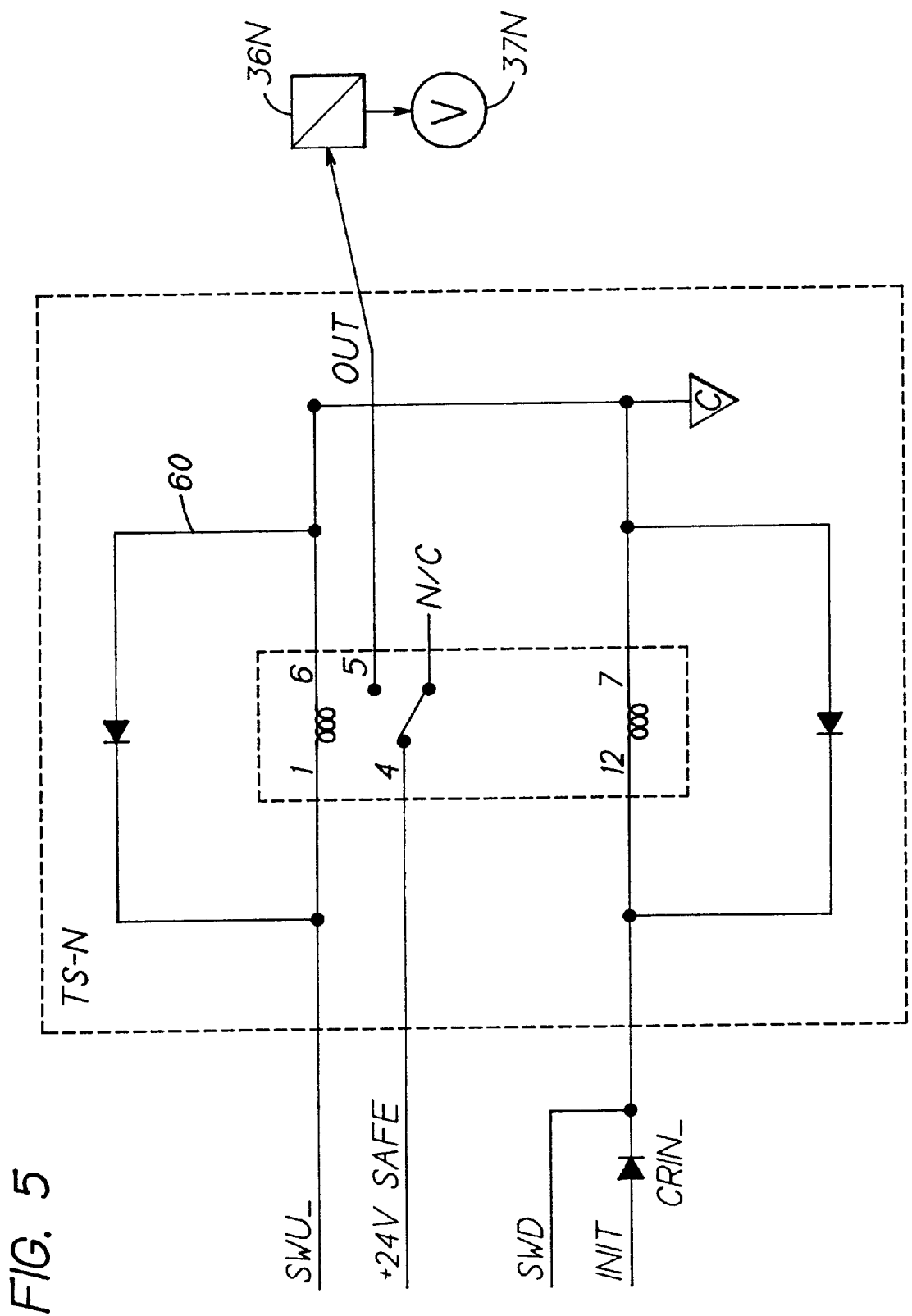
FIG. 5 is an electronic schematic for one of the toggle switches.

When the operator wants to operate the section manually, the cover 30 is pivotally displaced from its horizontal position shown in FIG. 1 to the vertical position shown in FIG. 2, thereby providing access to the manual control panel 32. As can be seen from FIGS. 2 and 3, there are three rows of ten on/off toggle switches 34 which are associated with three rows of ten solenoids 36N. Each solenoid 36N operates an associated regulator 37N (see FIG. 5). The switch function is defined on an associated information panel 38. When the solenoid operated valve is a single acting-spring return valve, such as Funnel Down/Up, the switch will locate the structure at either of its end positions (up or down) depending on the status of the switch (up or down). When the valve controlling a device is a double acting valve, which means that one of the 30 solenoid operated valves, when operated, will displace the associated valve to one of its end positions and a second solenoid operated valve will displace the associated valve to its other end position, two toggle switches will control the displacement of the associated device. For example, the far right switches on the upper and lower rows are "Takeout In" and "Takeout Out." Accordingly, to move the takeout in, the Takeout In toggle switch will have to be pushed up (with the Takeout Out toggle switch down) and vice versa.

When the operator wants to operate the section manually, the operator pushes the machine stop button 24 and lifts the cover 30 to secure access to the control panel 32. The coil of the MS Present Relay 40 will be picked by a +24V MS signal to close contacts A1–A2 so that a +24V CB (circuit breaker) signal will be simultaneously directed to the Safe To Start Relay 47 and to all of the toggle switches (SW1, SW2 . . . SWN). If every toggle switch is down and if the +24V CB signal is present (this is schematically illustrated with an and gate 44) the +24V CB signal will be delivered to the Override Enable switch (button) 45 thereby verifying that all the toggle switches are in the down position—FIGS. 2 and 3 (if any, toggle switch is up or if the circuit breaker has tripped, no signal will be delivered to the Override Enable switch). The system can then be enabled by pushing depressing the Override Enable button 45 on the control panel. The coil of the Safe to Start Relay 47 will be picked to thereby close contacts A1–A2, whereby a +24V Safe signal will be delivered to the left hand 48 and right hand 49 start motion buttons and to the override enable lamp under the override enable button so that the operator will know that the system has been enabled. The operator can now define (program) a desired machine state by selecting (switching selected toggle switches 34 from down to up position) or deselecting (switching selected toggle switches from up to down position) these regulators. To implement the defined gate the operator will then simultaneously push the left 48 and right 49 hand depressible start motion buttons. These start motion buttons are spaced sufficiently apart so that they can not be operated with one hand of the operator. The first start motion button pushed delivers via a parallel override signal line a parallel override signal conjointly to a 0.5 Second Interval On Timer 50 and to the coil of an Interval On Relay 52. The picked coil closes contacts A1–A2 to pass a serial override signal across the closed contacts when the second start motion button is pushed so long as the time between pushing the two start motion buttons does not exceed 0.5 second to prevent operation of the system in the event one of the start motion buttons is tied down. System operation accordingly requires simultaneous pushing of the start motion buttons, i.e., a time sufficiently short to also prevent both buttons being sequentially pushed by the operator by shifting his hand from button to button. The valid override signal picks the relay of a second Interval On Relay 54 to close contacts A1–A2 and simultaneously starts a second 0.5 Second Interval On Timer 56 which will assure a 0.5 second duration +24V Override (OVR) signal which turns the lamps on under the start motion buttons to confirm the operation of the system. This override signal is also supplied to each of the toggle switch circuits (TSN—FIG. 5). Where a toggle switch has been set to the up position, the +24V OVR signal will be delivered on the SWU (switch up) line to pick the upper coil of a bi-polar relay 60 closing contacts 4–5 to direct the +24V Safe Signal to actuate the solenoid 36N thereby operating an associated valve 37N. The valve may be a single acting—spring return valve and hence, the only valve operating a mechanism or it may be a double acting valve requiring two solenoids to fully operate the valve. Where a toggle switch is down the lower coil will be picked to close contacts 3–4 to no connects (N/C). Having operated these solenoids, the operator can define the next desired machine state by selecting or deselecting selected regulators and again manually operating the selected regulators by simultaneously pushing the start motion buttons. This can be repeated until repair or maintenance is complete.

The system is accordingly a two hand non tie down system. The operator can not operate the system by operating one start motion button with one hand while the other start motion button is tied down. The cover 30 functions as a barrier between the start motion buttons and the displaceable mechanisms.

I claim:

1. A machine for making glass containers comprising
   a plurality of mechanisms displaceable between known positions,
   means including a corresponding plurality of selectively operable regulators for displacing said mechanisms between said known positions,
   a corresponding plurality of toggle switches switchable between regulator on and regulator off positions, each toggle switch corresponding to one of said regulators,
   first and second depressible start buttons,
   means for enabling said first and second depressible start buttons, and
   means for operating each regulator that has its corresponding toggle switch positioned on, when said first and second enabled start buttons are depressed simultaneously.

2. A machine for making gleass containers according to claim 1, wherein said enableing means comprises means for verifying that each of said toggle switches is at the off position.

3. A machine for making glass container according to claim 2, wherein said enabling means further comprises a depressible enagle button.

4. A machine for making glass containers according to claim 3, wherein said operating means comprises a bipolar relay for each of said regulators.

5. A machine for making glass containers according to claim 1, further comprising a substantially horizontal control panel for supporting said toggle switches, a cover for said control panel and means for pivotally supporting said cover for pivotal displacement from a horizontal down position covering said toggle switches to a substantially vertical up position.

6. A machine for making glass containers according to claim 1, wherein said regulators are solenoid operated valves.

* * * * *